Figure 1:
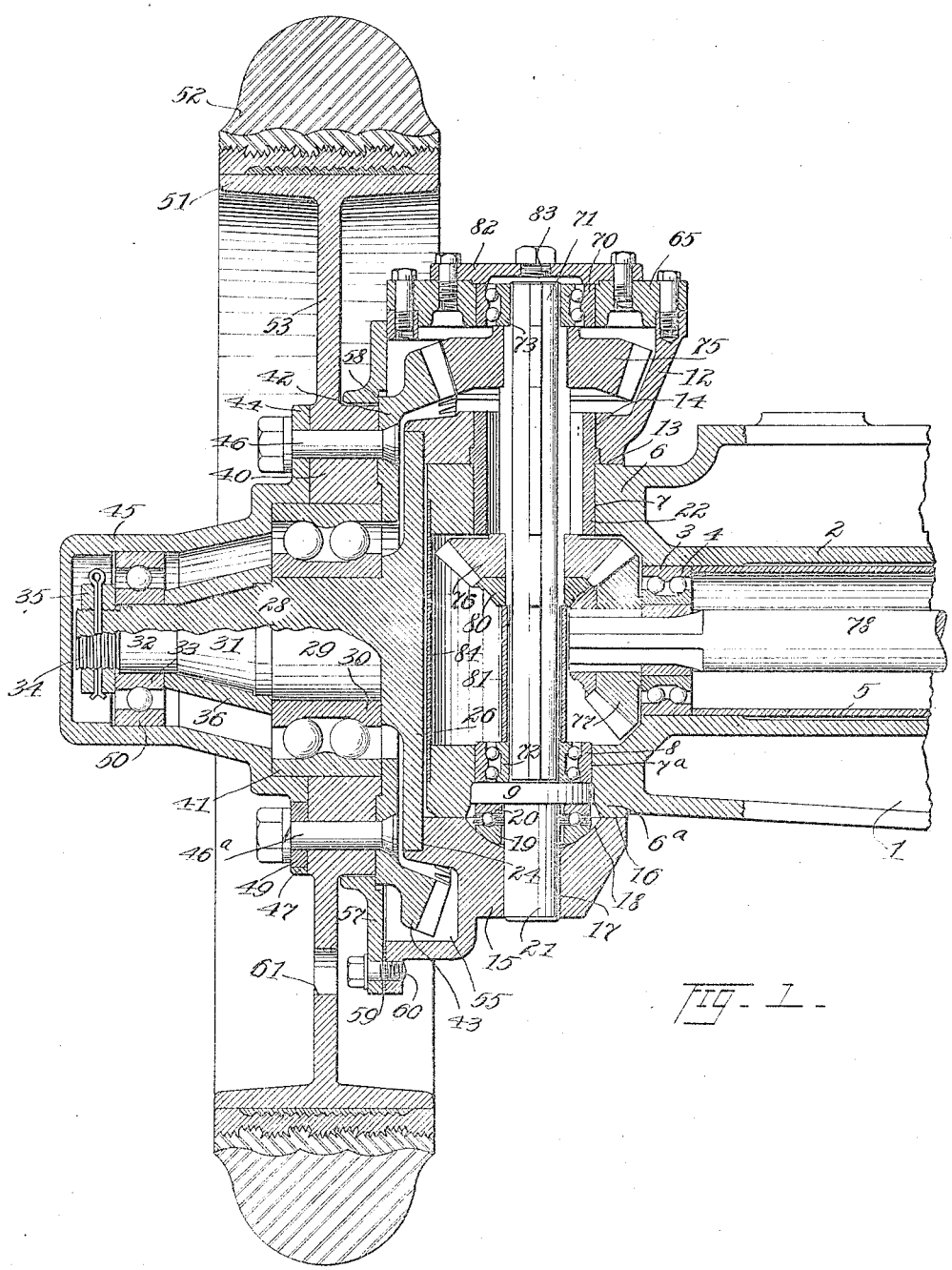

J. McGEORGE.
WHEEL FOR SELF PROPELLED VEHICLES.
APPLICATION FILED FEB. 27, 1913.

1,155,315.

Patented Sept. 28, 1915.
3 SHEETS—SHEET 3.

Witnesses
J. A. McIntyre.
R. L. Bruck.

Inventor
John McGeorge
By Hull & Smith, Attys.

UNITED STATES PATENT OFFICE.

JOHN McGEORGE, OF CLEVELAND, OHIO, ASSIGNOR TO THE CLEVELAND ENGINEERING COMPANY, OF CLEVELAND, OHIO, A CORPORATION OF OHIO.

WHEEL FOR SELF-PROPELLED VEHICLES.

1,155,315.  Specification of Letters Patent.  Patented Sept. 28, 1915.

Application filed February 27, 1913. Serial No. 751,117.

*To all whom it may concern:*

Be it known that I, JOHN McGEORGE, a citizen of the United States, residing at Cleveland, in the county of Cuyahoga and State of Ohio, have invented a certain new and useful Improvement in Wheels for Self-Propelled Vehicles, of which the following is a full, clear, and exact description, reference being had to the accompanying drawings.

This invention relates to self-propelled vehicles and has particular reference to the wheels of such vehicles. Hitherto the common practice in regard to self-propelled vehicles has been to effect the driving and the steering by means of different wheels, in view of the greater complexity required in a case where a single wheel is made to serve both purposes. This complexity has been augmented by the fact that the common practice has been to deflect the wheels for steering purposes through the agency of a knuckle joint between the spindle upon which the wheel is journaled and the axle at the end of which the wheel is located, the "fifth wheel" or turntable idea having found but small favor in the eyes of manufacturers. Instances in which a knuckle-mounted wheel has been employed both for driving and steering purposes are, however, not unknown, such an arrangement being disclosed in the prior patent of J. and H. McGeorge, dated April 14, 1908, No. 884,752 and already in use with a considerable degree of success. Recently, however, the subject of combined driving and steering wheels has received renewed emphasis by reason of the demand for self-propelled vehicles to be used in very crowded and congested spaces and which can be turned and maneuvered in cramped and narrow quarters, as in docks, railway station platforms, warehouses, and the holds of ships. This use practically necessitates a vehicle wherein each of the wheels can be deflected for steering purposes, since such a vehicle can be operated in either direction with equal facility, and will turn within a shorter radius and in a more symmetrical manner than a vehicle wherein some of the wheels have fixed axles. Still more important is the fact that in a case where the power is applied to a pair of fixed rear wheels and the forward wheels are deflectable about stub axles, the angle of deflection of the forward wheels is absolutely limited to 45° since above this point skidding will invariably take place under even the best of conditions while under less perfect conditions of traction surface skidding will occur at a yet smaller angle.

Accordingly the objects of this invention are the provision of a combined driving and steering wheel specially applicable to trucks and like vehicles in which the wheels are deflectable through an extremely wide angle without in the least obstructing the driving operation; the provision of a construction of combined steering and driving wheel wherein the mechanical parts may be of strong and rugged construction without at the same time rendering the wheel cumbersome and hard to operate; the provision of a construction of combined steering and driving wheel wherein all parts are completely incased and protected from the elements or from the admission of sand and other foreign matter; the provision of a combined steering and driving wheel wherein the hub shall be of comparatively small size permitting the employment of cheap and easy running bearings and wherein the power is applied at a point outside of the hub whereby greater strength is secured; the provision of a device of this character of great strength, simplicity, reliability and attractiveness of design; while further objects and advantages will become apparent as the description proceeds.

Figure 2:
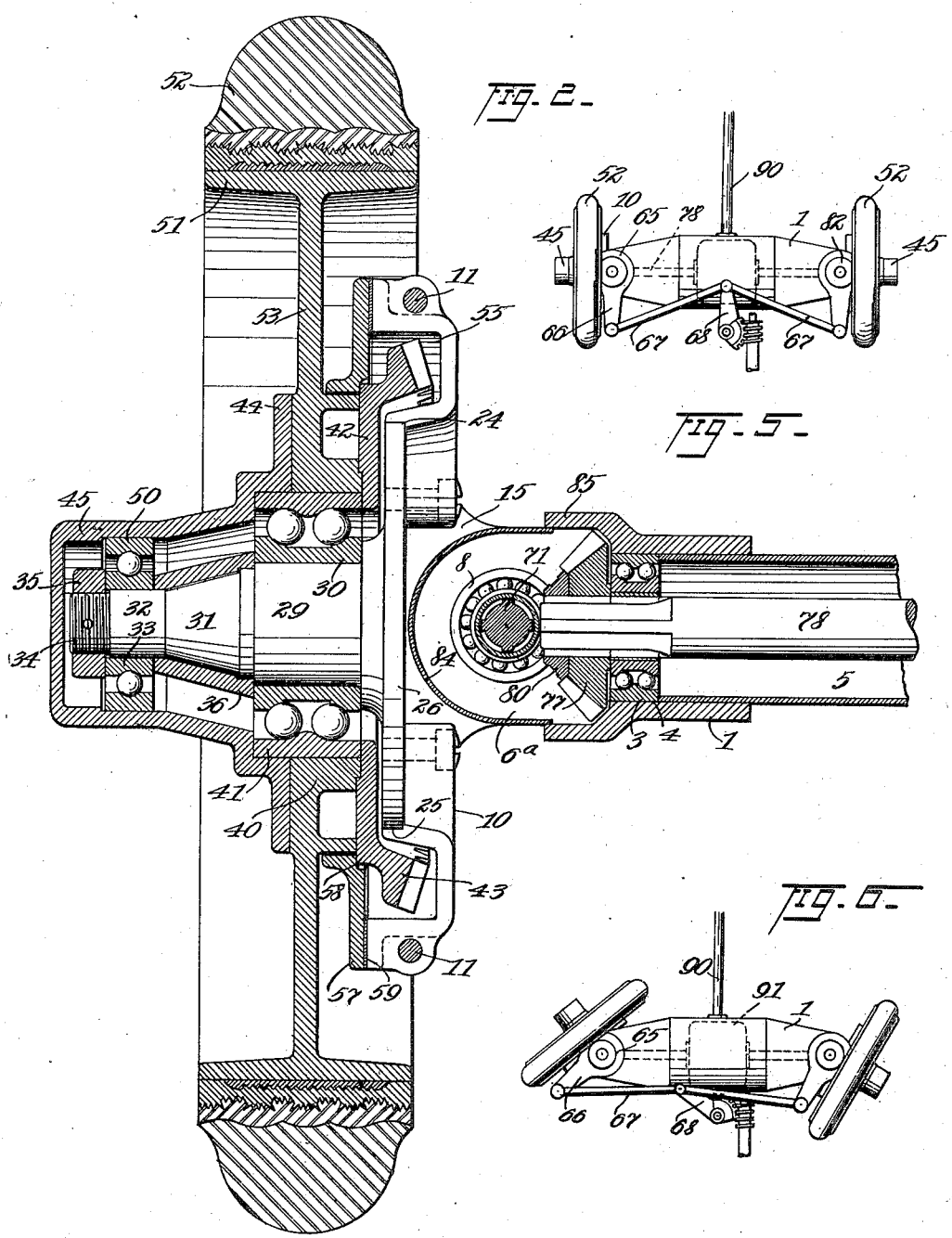
Figure 3:
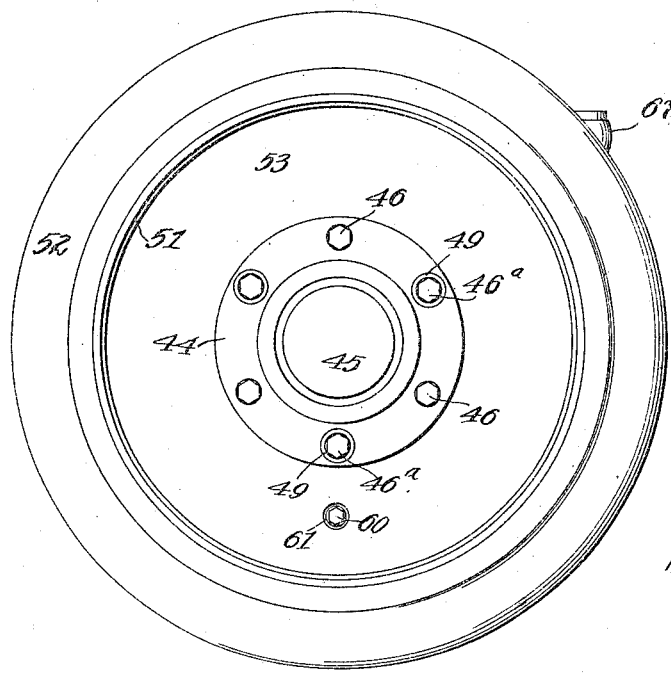
Figure 4:
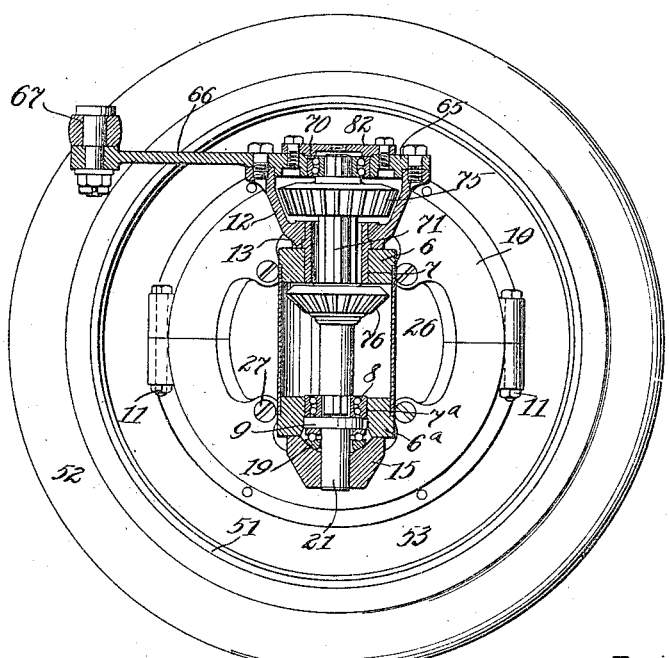

Generally speaking, my invention may be defined as consisting of the combinations and constructions recited in the claims hereto annexed and illustrated in the drawings accompanying and forming a part of this application, wherein Figure 1 is a vertical, transverse cross-sectional view taken through the center of my improved wheel, together with a part of the axle to which the same is secured; Fig. 2 represents a horizontal, cross-sectional view of the same wheel, taken through the center thereof and looking downwardly; Fig. 3 is an outside elevation of the wheel; Fig. 4 represents an inside elevation of the wheel, the driving mechanism being shown in cross section; Fig. 5 is a top plan view of an axle provided at each end with a wheel of my invention and illustrating the preferred form of steering connection, the wheels being shown in parallel position; and Fig. 6 is a view similar to Fig. 5 showing the wheels in one position of considerable deflection.

Describing the parts by reference characters, 1 represents generally the vehicle axle, the same being here shown as a hollow casting having a central tubular portion 2 reamed at its ends as illustrated at 3 for the reception of the fixed race 4 of a suitable anti-friction bearing, and having an interior sleeve or liner 5 whereby an oil-tight chamber is produced.

It will be understood that any desired or approved type of axle may be employed within the purview of my invention, and that the same may be made of a single piece or of a plurality of sections as may be desired, it being merely essential that a firm and rigid attachment be provided for the parts hereafter to be described. This axle is provided at each end with a pair of vertically spaced, parallel, horizontal projections 6—6ª, whose outer surfaces are preferably faced off to provide smooth bearing surfaces and whose extremities are preferably of semi-circular form as illustrated in Fig. 2. These projections are formed with vertical apertures 7 and 7ª, respectively the upper or inner portion of the aperture 7ª being reamed for the snug reception of the fixed ring 8 of a suitable anti-friction bearing, and the lower part of the same aperture being counterbored for the snug reception of a supporting member 9 whose purpose will be later described.

Mounted upon the end of the axle is a combined wheel-supporting and steering ring 10, preferably made in two parts, as illustrated in Figs. 2 and 4 secured together by suitable bolts 11, and having its plane of bi-section substantially horizontal. The upper half of this ring is provided with a laterally-projecting, cup shaped portion 12 whose inner face is planed as at 13 so as to rest snugly against the outer face of the projection 6. This cup is also formed with an aperature 14 adapted to register with the aperture 7. Likewise the lower half of the ring is provided with a laterally projecting portion 15 whose upper surface is faced at 16 for co-action with the similarly faced underside of the projection 6ª. The projection 15 is formed with a vertical aperture 17 adapted to register with the aperture 7ª, the upper end of said aperture 17 being formed with a spherical counterbore 18 for the reception of the similarly formed stationary ring 19 of a thrust bearing, the other part 20 of which rests against the bottom face of the member 9. Suitable anti-friction members interposed between these bearing rings serve to support the end of the axle and thereby carry the weight of the vehicle, while a stud 21 carried by the member 9 projects into the aperture 17 and holds the ring and axle against displacement. Obviously the stud 21 can be secured in either of the apertures and project into the other aperture. The relative positions of the axle projection 6 and the ring projection 12 are fixed by means of a hollow sleeve 22 fixed in one of the apertures 7 or 14 and projecting into the other of said apertures. In the present embodiment, this sleeve is fixed in the aperture 14 and is journaled in the aperture 7, but it will be obvious that this arrangement could be inverted without invention. The outer face of this ring 10 is formed with an annular seat 24 preferably surrounded by a flange 25 as shown in Fig. 2.

The wheel supporting member consists of a flat, circular, metallic plate 26 secured to the seat 24 in any suitable manner as by bolts 27 and having on its outer face a central, wheel-supporting spindle 28. In the embodiment here illustrated, said spindle comprises a cylindrical portion 29 adjacent to the plate 26 and carrying the fixed member 30 of a suitable anti-friction bearing, a conical extension 31 beyond this cylindrical portion, a second smaller cylindrical portion 32 beyond this extension forming a seat for the reception of the fixed member 33 of a second or steadying bearing, and a terminate threaded portion 34 adapted for the reception of a suitable nut 35 whereby the member 33 is held in place. A spacing sleeve 36 is shown as introduced between the members 30 and 33 so that the two may be securely gripped in position by the nut 35.

The wheel member proper comprises an annular central portion 40 having a cylindrical central aperture receiving the movable member 41 of an anti-friction bearing coöperating with the member 30 in the reception of suitable anti-friction members as shown. Secured to the inner face of this central portion is the flat annular web 42 of a beveled gear 43, while secured to the outer face of the portion 40 is the base flange 44 of a cap member 45. The gear and cap member may be secured in place by bolts 46, but I preferably form the flange 44 with apertures 47 of considerable size surrounding alternate bolts 46ª, and employ with these bolts annular filling blocks 49 of a thickness substantially equal to that of the flange, this arrangement permitting the removal of the cap 45, merely by removing the nuts of the bolts 46 without at the same time detaching the gear 43 from the wheel. The forward end of the cap is made interiorly cylindrical in shape for the reception of the annular member 50 of an anti-friction bearing, which, in conjunction with the member 33, forms a raceway for suitable anti-friction members whereby the wheel is steadied upon the main bearing. This cap also forms a lubricant chamber and prevents the admission of dust and foreign matter as will be understood.

The outer portion of the wheel is formed with an annular flange or felly 51 to which is secured a tire 52 of any preferred form or construction, the annular portion 40 and the rim or felly portion 51 being connected in any desired manner, as by the flat annular web 53. Obviously this web could be corrugated, folded, or made in the form of separate spokes, if desired, entirely without effecting the merits of the present invention, or may even be made in a plurality of parts. The web form is shown herein because of the fact that the same is frequently desired in the case of wheels of comparatively small diameter.

The laterally projecting portion of the gear 43 is received in an annular groove 55 formed in the ring member 10. To the outer face of this ring is secured a flat annular cover plate 57 whereby the entrance of foreign matter and the loss of lubricant is prevented. The edge of the portion 42 of the gear preferably extends slightly beyond the portion 40 of the wheel, as shown at 58, and the cover plate 57 is recessed or otherwise formed to make a tight, rotary joint therewith, while leakage between the plate and the face of the ring may be guarded against by a gasket 59. The plate 57 is attached to the ring by means of screws or like fastening devices 60, the web 53 being apertured as at 61 so as to afford access thereto.

The upper part of the cup portion 12 of the ring 10 is formed for the reception of a plate 65 which preferably has at one side the laterally projecting arm 66 which projects parallel to the plane of the wheel as illustrated in Figs. 5 and 6. To the outer ends of these arms are articulated the links 67, 67, whose opposite ends are articulated together upon the end of a steering arm 68 as fully explained in my copending application, filed March 14, 1913 Ser. No. 754234. Of course it will be obvious that any desired form of link attachment or other turning device could be employed in connection with these wheels, but I recommend the arrangement illustrated in Figs. 5 and 6, because of the extremely wide steering angle permitted thereby without side slipping.

The central portion of the plate 65 is apertured for the reception of the fixed member 70 of an anti-friction bearing, the same being in alinement with the apertures 7, 7ª, 14 and 17. Traversing these apertures is a vertical shaft 71, coincident with the knuckle axis and having suitable bearing members 72, 73, mating with the members 8 and 70 respectively. The lower end of the shaft 71 terminates just above the member 9.

Secured to the upper and outer end of the shaft 71 is a bevel pinion 75 meshing with the gear 43. Secured to the shaft within the space defined by the projection 6 and 6ª is a second beveled pinion 76 meshing with a bevel gear 77 attached to the end of the axle shaft 78. These various pinions and gears may obviously be connected to their shafts in any one of a great number of ways, the particular method I have illustrated herein comprising the longitudinal milling of the shaft to form a plurality of integral ribs or keys which are thereafter ground to form portions of different heights for the reception and secure attachment of the various pinions, bearings, etc. These pinions, bearings, etc., are formed with interior tongues adapted to fit in the spaces between the ribs or keys and thus prevent slipping. In the present embodiment, I have illustrated the gears 76 and 77 as held together in proper mesh by means of conical engaging collars 80, although I have also illustrated a hollow sleeve 81 interposed between one of these collars and the bearing member 72 for the purpose of supporting the weight of the shaft 71.

The upper end of the shaft 71 and its upper bearing are covered by a plate 82 which may have a central aperture 83 for the admission of lubricant, the same being closed in any convenient manner. The ends of the projections 6, 6ª may also be recessed, as shown in Fig. 1, for the reception of a semi-circular closure 84, whereby the space between the projections is inclosed. The ends of this closure are shown as secured to integral webs 85 connecting the bases of the projections (see Fig. 2). The shafts 78—78 may be driven by a main propeller shaft 90 through the agency of a differential 91, or by a clutch mechanism such as disclosed and claimed in my copending application filed June 27, 1912, Ser. No. 706259 or by separate electric motors, or in any other suitable or convenient manner.

The assembling and operation of the mechanism is as follows: The axle 1 having first been provided with its shafts 78—78, the halves of the ring 10 are applied to the projections 6, 6ª, and those halves secured together by the bolts 11. The bearing members 8, 9, 19 and 20 and the sleeve 74 will have been positioned prior to the attachment of the ring. The pinion 77 and its core ring are now applied to the end of the shaft 78 after which the shaft 71 with its pinion and bearings is mounted in place. The cap or shield 84 having been secured in its recess, the plate 26 is next attached to its seat and the wheel proper applied thereto. Finally the cover plate 82 is mounted in place and the assembling is complete.

The driving and steering possibilities of this wheel are too obvious to require extended description. Lubrication is effected partly by way of the axle sleeve 5 and partly by way of the aperture 83. The lowermost portion of the annular groove 55 forms a well or pocket for the reception of lubricant into which the edge of the gear 43 dips continually, thereby keeping the same thoroughly lubricated and carrying more or less of the same to the main bearings of the wheel; the spherical counterbore 18 also forms a lubricant well whereby the thrust bearings 19 and 20 are plentifully supplied.

While I have described my invention in detail, and pointed out at length the constructions and arrangements which my experience shows to be most satisfactory, I do not propose to be limited to such details except as the same may be positively recited in the claims hereto annexed or may be made necessary by the prior state of the art.

Having thus described my invention, what I claim is:—

1. In a self-propelled vehicle, the combination, with an axle having at each end a pair of vertically spaced, substantially horizontal extensions, and a supporting member having a wheel receiving spindle, of means including a hollow sleeve for pivoting said supporting member to said projection, such pivot axis being substantially vertical and said wheel receiving spindle being substantially horizontal, a wheel journaled upon said spindle and lying at one side of said pivot axis, an annular gear secured to the inner face of said wheel and extending outside of said projections, a rotatable shaft journaled in said axis, a gear carried by said shaft between said projections, a transverse shaft coinciding substantially with the pivot axis and projecting through said hollow sleeve, a pair of spaced pinions carried by said last shaft, one of said pinions being located outside of said projections and meshing with said annular gear, and the other of said pinions being located between said projections and meshing with said shaft gear, and a housing covering said annular gear and the pinion meshing therewith.

2. In a self propelled vehicle, the combination, with an axle having a recess defined between upper and lower supporting portions, the end of said axle being rounded about a vertical center, of a ring having laterally extending projections embracing the supporting portions of said axle above and below the same, hollow interfitting means carried by said supporting portions and projections permitting a pivotal movement of said ring relatively to said axle about a substantially vertical axis, a wheel supporting member carried by said ring, a wheel journaled to said supporting member, an annular gear secured to the face of said wheel outside of said supporting portions, a rotatable shaft substantially coinciding with the pivot axis of said ring and projecting through said hollow means, a drive shaft journaled in said axis and having a gear inside said recess, and pinions carried by said first shaft and meshing with both said gears.

3. In a self propelled vehicle, the combination, with an axle having a recess defined between upper and lower supporting portions, the end of said axle being rounded about a vertical center, of a ring having laterally extending projections embracing the supporting portions of said axle above and below the same, one of said projections being hollow and forming a housing, hollow interfitting means carried by said supporting portions and projections permitting a pivotal movement of said ring relatively to said axle about a substantially vertical axis and establishing communication between said recess and said housing, a wheel supporting member carried by said ring, a wheel journaled to said supporting member, an annular gear secured to the face of said wheel outside of said supporting portion, said gear passing through said housing, a rotatable shaft substantially coinciding with the pivot axis of said ring and projecting through said hollow means, a drive shaft journaled in said axle and having a gear inside said recess, a pinion carried by said first shaft within said housing and meshing with said annular gear, and a second pinion carried by said first shaft within said recess and meshing with said shaft gear.

4. In a self propelled vehicle, the combination, with an axle having a recess defined between upper and lower supporting portions, of a ring pivoted to said supporting portions upon a substantially vertical axis, the pivoting means being hollow and arranged to permit a movement of said ring relatively to said axle about a substantially vertical axis, a wheel supporting member carried by said ring, a wheel journaled to said supporting member, an annular gear carried by said wheel, a rotatable shaft substantially coinciding with the pivot axis of said ring, a drive shaft journaled in said axis and having a gear inside said recess, pinions carried by said transverse shaft and meshing with both said gears, a journal bearing carried by said ring and engaging said transverse shaft at a point adjacent to said annular gear, and a second journal bearing carried by said axle and engaging said transverse shaft adjacent to said shaft gear.

5. In a self-propelled vehicle, the combination, with an axle and a driving shaft rotatably journaled in said axle, of a combined bearing and steering ring pivotally secured to the end of the axle upon an axis generally transverse thereto, said ring having a wheel receiving spindle whose axis is substantially transverse to said pivotal axis, a wheel journaled upon said spindle and located entirely to one side of said pivot axis, an annular gear secured to the face of said wheel and surrounding said spindle, a gear carried by the end of said shaft, a second shaft projecting freely through said pivot axis, pinions carried by said second shaft and meshing with both of said gears, a journal bearing carried by said ring and supporting said shaft at a point adjacent to said annular gear, and a second journal bearing carried by said axle and supporting said shaft adjacent to said shaft gear.

6. In a self-propelled vehicle, the combination, with an axle having integral vertically spaced, parallel, supporting portions, the ends of said portions being rounded, of a ring having laterally extending projections overlapping said supporting portions, hollow interfitting means carried by said supporting portions and projections permitting a pivotal movement about a substantially vertical axis, a fixed plate carried by said ring and having a bearing member on its outer side, a wheel member journaled upon said bearing member, an annular gear secured to the face of said wheel outside of said plate, a rotatable shaft substantially coinciding with the pivot axis of said ring and projecting through said hollow means, a pinion carried by said shaft outside of said supporting portions and meshing with said wheel gear, means for driving said shaft, and a closure plate secured to said projections and inclosing the space therebetween.

7. In a self-propelled vehicle, the combination, with an axle and a wheel receiving spindle pivoted thereto upon a substantially vertical axle, said spindle having a main bearing portion at the end nearest said axle and an auxiliary bearing concentric with the main bearing but spaced laterally therefrom in a direction away from said axle, of a wheel surrounding said spindle and carried by said main bearing, a hollow cap carried by the outer face of said wheel, a secondary bearing member carried by said cap and coöperating with said secondary bearing member whereby rocking of said wheel is prevented, a laterally facing annular beveled gear secured to the rear face of said wheel outside of said main bearing, a transverse shaft journaled in said axle, a pinion carried by said shaft and meshing with said gear, and means for driving said shaft.

8. In a self-propelled vehicle, the combination, with an axle having at its end a pair of vertically-separated, parallel, bearing members, of a wheel supporting member having a pair of vertically spaced, laterally projecting portions overlapping said bearing members, said projections and bearing members being formed with alined appertures, a sleeve carried by one of said members and projecting into the aperture of the other member, a thrust annulus mounted in the aperture of one member, a thrust bearing surrounding the aperture in the adjacent member and resting against said thrust annulus, a wheel rotatably journaled to said supporting member upon an axis substantially perpendicular to the axis of said apertures, an annular gear secured to the face of said wheel member, a shaft concentric with said apertures, a pinion carried by said shaft and meshing with said gear, and means for imparting rotating movement to said shaft.

9. In a self-propelled vehicle, the combination, with an axle having at its end a pair of vertically-separated, parallel, bearing members and a driving shaft journaled in said axle and having a gear located between said bearing members, of a wheel supporting ring surrounding said axle and having a pair of vertically spaced, laterally projecting portions overlapping said bearing members, said projections and bearing members being formed with alined apertures, hollow interengaging pivoting means concentric with said apertures, a wheel rotatably journaled to said supporting member upon an axis substantially perpendicular to the axis of said apertures, an annular gear secured to the face of said wheel member, outside of said bearing members, a transverse shaft concentric with said pivot axis and projecting through said pivoted means, pinions carried by said transverse shaft and meshing with said gears, and means for inclosing the space between said bearing members.

10. In a self-propelled vehicle, the combination, with an axle having at each end a pair of vertically spaced, parallel, substantially horizontal, projections, of a ring having a pair of spaced, laterally extending, parallel projections adapted to overlap said first projections, means for pivoting said projections together upon a substantially vertical axis, a member secured to the side of said ring and having a projecting bearing portion, a wheel journaled upon said bearing portion, an annular laterally facing gear secured to the face of said wheel and surrounding said ring projections, a driving shaft carried by said axle and having a gear in the space between the axle projections, a transverse shaft journaled substantially in coincidence with the pivot axis, and a pair of spaced pinions carried by said transverse shaft, one of said pinions being located outside of said projections and meshing with said annular gear and the other being located between said projections and meshing with said shaft gears.

11. In a self-propelled vehicle, the combination, with an axle having at each end a pair of vertically spaced, parallel, substantially horizontal, bearing faces, of a ring having a pair of spaced, inwardly turned parallel bearing faces adapted to engage said first faces, means for pivoting said ring and axle together upon a substantially vertical axis normal to said faces, a wheel supporting member secured to the side of said ring, a wheel journaled upon said member, an annular laterally facing gear secured to the face of said wheel, said ring having an annular groove receiving the projecting portion of said gear, a driving shaft carried by said axle and having a gear on its end, a transverse shaft journaled substantially in coincidence with the pivot axis, pinions carried by said transverse shaft and meshing with both of said gears, and an annular cover plate secured to the outer wall of said annular groove and engaging the rearward face of said wheel gear whereby said wheel gear is inclosed.

12. In a self-propelled vehicle, the combination, with an axle having at each end a pair of vertically spaced, parallel, substantially horizontal, projections, of a two-part ring, each of the parts of said ring having a laterally extending projection adapted to overlap one of said axle projections, all of said projections having registering apertures and the uppermost of said ring projections being hollow, means concentric with said apertures for pivoting said ring projections to said axle projections, a plate secured to the side of said ring and having a bearing portion generally transverse to the axis of said apertures, a wheel journaled upon said bearing portion, an annular gear secured to the face of said wheel and having a tooth-carrying portion projecting laterally therefrom, the face of said ring being grooved for the reception of said gear, a driving shaft journaled in said axle, and having a gear in the space between said axle projections, a transverse shaft journaled in substantial coincidence with the said apertures, a pinion carried by said transverse shaft between said axle projections and meshing with said driving gear, a second pinion carried by said transverse shaft within said hollow ring projection and meshing with said wheel gear, closure means attached to said axle projections, and inclosing said driving gear and first pinion, a cover plate secured to the outer wall of said groove and inclosing said wheel gear, and a plate secured to said hollow ring projection and inclosing said last pinion.

13. In a self-propelled vehicle, the combination, with an axle having at each end a pair of vertically spaced, parallel, substantially horizontal, bearing faces, of a two-part ring, each of the parts of said ring having an inwardly facing flattened face adapted to overlie one of said axle faces, all of said faces having registering apertures, a rotatable shaft projecting through said aperture, a spindle carrying member secured to the side of said ring, a wheel journaled upon such spindle, an annular gear secured to the face of said wheel, a driving shaft carried by said axle, a gear carried by said driving shaft, a pinion carried by said first shaft and meshing with said driving gear, a second pinion carried by said first shaft and meshing with said wheel gear, and means for inclosing all of said gears and pinions.

14. In a self-propelled vehicle, the combination, with an axle, of a ring pivoted to the end thereof upon a substantially vertical axis, the side of said ring overhanging the end of said axle, a substantially flat plate secured to the side of said ring and having a wheel receiving spindle projecting from its outer face, a wheel journaled upon said spindle, and an arm projecting from said ring whereby the same may be turned about its axis.

15. In a self-propelled vehicle, the combination, with an axle, of a ring pivoted to the end thereof upon a substantially vertical axis and having a substantially flat face, a separate member secured to the side of said ring and having a wheel receiving spindle projecting from its outer face, a wheel journaled upon said spindle outside of said ring and making a substantially dust tight joint with the side of said ring, a driving shaft journaled within said axle, means for transmitting the motion of said driving shaft to a part of said wheel outside of said ring, and means connected to said ring whereby the same may be turned about its axis.

16. In a self-propelled vehicle, the combination, with an axle, of a ring having bearing portions coöperating with the ends of said axle, and pivoted thereto upon a substantially vertical axis, a wheel supporting spindle secured to the outer face of said ring, a wheel journaled upon said spindle at one side of said ring, an arm projecting from said ring in a direction substantially parallel to the plane of said wheel, and a link articulated with said arm whereby said ring may be turned.

In testimony whereof, I hereunto affix my signature in the presence of two witnesses.

JOHN McGEORGE.

Witnesses:
BRENNAN B. WEST,
HAROLD E. SMITH.